P. HELDMANN.
MACHINE FOR CUTTING BOOKS.
APPLICATION FILED NOV. 15, 1912.
1,088,573.
Patented Feb. 24, 1914.
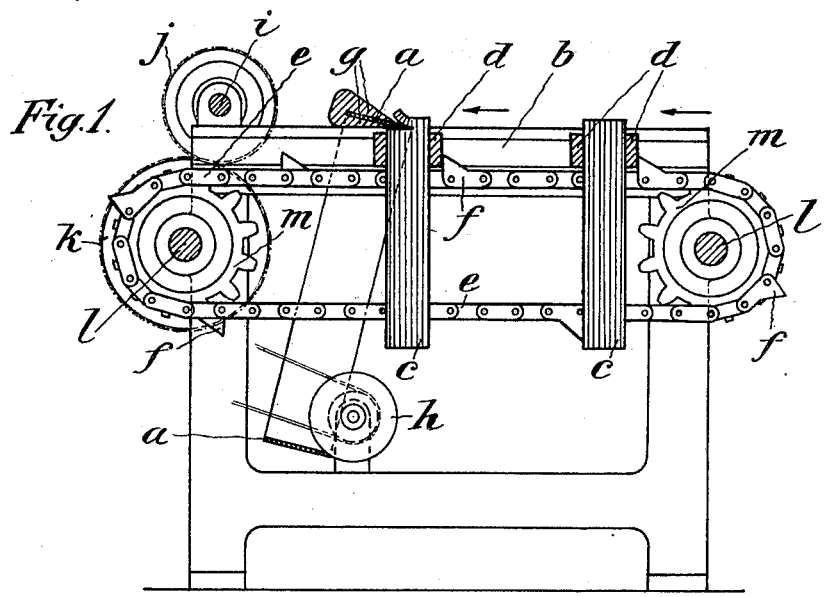
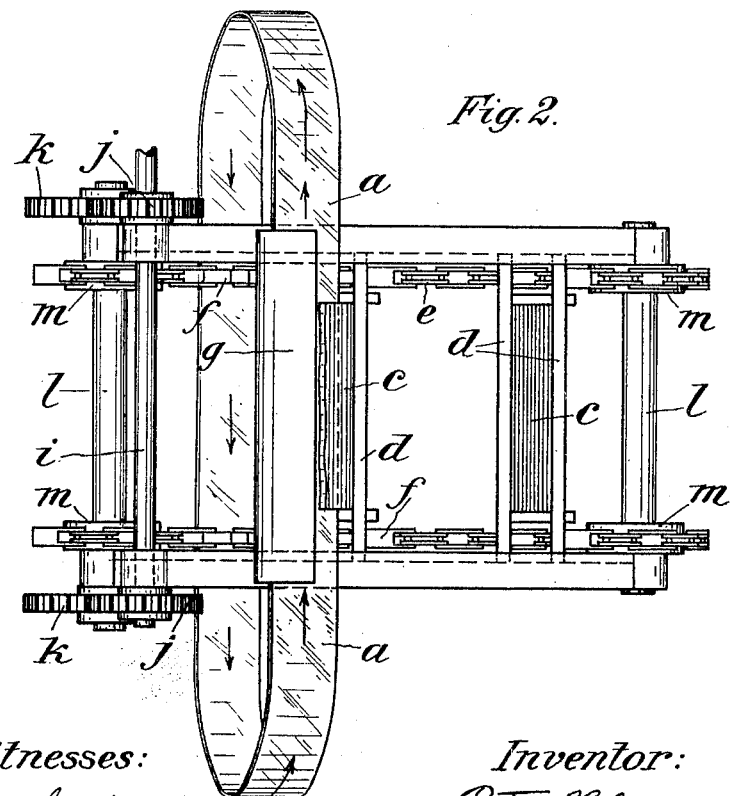
Witnesses:
C. D. Swett.
C. H. Woodward.
Inventor:
Peter Heldmann
G. Dittmar
by:
Attorney.

UNITED STATES PATENT OFFICE.

PETER HELDMANN, OF FRANKFORT-ON-THE-MAIN, GERMANY, ASSIGNOR TO JULIUS VOTTELER, OF WURTTEMBERG, GERMANY.

MACHINE FOR CUTTING BOOKS.

1,088,573.  Specification of Letters Patent.  Patented Feb. 24, 1914.

Application filed November 15, 1912. Serial No. 731,585.

*To all whom it may concern:*

Be it known that I, PETER HELDMANN, a subject of the Grand Duke of Hesse, residing at 9 Schöne Aussicht, Frankfort-on-the-Main, in the Kingdom of Prussia and Empire of Germany, have invented new and useful Improvements in Machines for Cutting Books, of which the following is a specification.

This invention relates to machines for cutting books, and has for its object to provide for a continuous cutting action and to obtain a perfectly clean cut.

Use is made in the improved machine of a cutter which consists of an endless band knife arranged obliquely to the line of cut.

A constructional form of the invention is represented by way of example in the accompanying drawing, wherein—

Figure 1 shows a sectional side elevation, and Fig. 2 a plan of the machine.

The machine comprises an endless band knife $a$ passing around two inclined pulleys (not shown) provided one on each side of the machine frame (Fig. 2). This band knife $a$ has its blade arranged at an inclination to the guide $b$ (Fig. 1), wherein the books $c$, held by clamps $d$ and introduced at the front end of the machine (as indicated by arrows in Fig. 1), are conducted, through the agency of endless chains $e$ or the like furnished with dogs $f$, to the band knife $a$, and are thus cut continuously and obliquely to the line of cut, as will be understood on reference to Fig. 1.

Owing to its arrangement at an inclination to the line of cut, the band knife $a$ can be guided between cheeks or jaws $g$ (Fig. 1). With the aid of a rotary grindstone $h$ (Fig. 1) the grinding of the cutting edge takes place only on the inner side of the blade during the movement of the band knife.

The arrangement of the aforesaid two pulleys and the other intermediate gear by which a continuous movement is imparted to the endless band knife $a$ from the driving shaft $i$ of the machine is not represented in the drawing, as it does not form part of this invention and moreover presents no difficulty. Gear wheels $j$ and $k$ secured upon the driving shaft $i$ and upon one of the shafts $l$ carrying the sprocket wheels $m$ serve to transmit continuous movement to the endless chains $e$, there being of course a certain speed ratio, determined by practical experience, between the continuous movement of these chains and that of the band knife $a$. Similarly the grindstone $h$ receives its movement from the driving shaft $i$ or the sprocket shaft $l$ by a belt $n$ or other appropriate gear.

I claim:

1. In a machine for cutting books the combination of an endless band knife, arranged obliquely to the line of cut, and means for supporting the said band knife along its cutting section.

2. In a machine for cutting books the combination of an endless band knife, arranged obliquely to the line of cut, and cheeks for supporting the said band knife along its cutting section.

3. In a machine for cutting books, an endless band knife, arranged obliquely to the line of cut, means for supporting the said band knife along its cutting section, a guide for the books to be cut, clamps adapted to be conducted along such guide, and means for conveying these clamps to the endless band knife.

PETER HELDMANN.

Witnesses:
JEAN GRUND,
CARL GRUND.

---

Copies of this patent may be obtained for five cents each, by addressing the "Commissioner of Patents, Washington, D. C."